United States Patent [19]
Motokado et al.

[11] Patent Number: 5,940,084
[45] Date of Patent: Aug. 17, 1999

[54] CHARACTER GENERATING METHOD AND APPARATUS

[75] Inventors: Shinichiro Motokado; Tomoko Motokado, both of Kawasaki; Mutsumi Ohtomo, Higashi-ku, all of Japan

[73] Assignee: Fujitsu Limited, Kanagawa, Japan

[21] Appl. No.: 08/147,815

[22] Filed: Nov. 4, 1993

[30] Foreign Application Priority Data

Nov. 9, 1992 [JP] Japan ................................. 4-298360

[51] Int. Cl.⁶ .................................................. G06T 11/60
[52] U.S. Cl. ........................................ 345/468; 345/441
[58] Field of Search ................................. 395/150–151, 395/144, 141; 345/435, 439, 441, 467, 468, 472

[56] References Cited

U.S. PATENT DOCUMENTS

| | | | |
|---|---|---|---|
| 4,748,443 | 5/1988 | Uehara et al. | 340/751 |
| 4,897,638 | 1/1990 | Kokunishi et al. | 340/751 |
| 5,109,352 | 4/1992 | O'Dell | 395/150 |
| 5,301,267 | 4/1994 | Hassett et al. | 395/150 |
| 5,305,433 | 4/1994 | Ohno | 395/150 |

FOREIGN PATENT DOCUMENTS

| | | |
|---|---|---|
| 175260 | 3/1989 | Japan . |
| 1257995 | 10/1989 | Japan . |

Primary Examiner—Mark K. Zimmerman
Attorney, Agent, or Firm—Helfgott & Karas, PC.

[57] ABSTRACT

A character generating method and apparatus which arrange a plurality of partial patterns constituting a character to the start positions of the partial patterns to generate a character pattern. A memory of the apparatus stores origin position data of the partial patterns firstly in a partial-pattern coordinate system, set by a character coordinate system, start position data of basic patterns in the partial-pattern coordinate system and shape data of the basic patterns. The origin position data of those individual partial patterns which constitute a desired character pattern and the start position data of those basic patterns which constitute the partial patterns are read out from the memory and the absolute start positions of the basic patterns are computed from the read origin position data and start position data in a character generating circuit of the apparatus, and the basic patterns, defined by the shape data, at the respective absolute start positions are arranged to generate the desired character pattern. The memory of the character generating apparatus is formed by a common file for storing origin position data of the partial patterns in a partial-pattern coordinate system, set by a character coordinate system, and start position data of the basic patterns in the partial-pattern coordinate system, and an individual file for storing shape data of the basic patterns.

20 Claims, 17 Drawing Sheets

COMMON FILE

ELEMENT COORDINATE SYSTEM

CHARACTER COORDINATE SYSTEM

FONT FILE (COMMON FILE)

(FONT FILE)

CHARACTER GENERATING METHOD AND APPARATUS

CROSS REFERENCE TO RELATED APPLICATION

CHARACTER GENERATING METHOD AND APPARATUS, Ser. No. 009,896, filed Mar. 8, 1993, assigned to the FUJITSU LIMITED and OHTOMO LABORATORY LIMITED.

BACKGROUND OF THE INVENTION

1. Field of the Invention

The present invention relates to a character generating method and apparatus for generating character patterns, which arrange a plurality of partial patterns constituting a character to each start point to generate the associated character pattern.

2. Description of the Related Art

Character patterns are widely used in apparatuses which display and/or print characters. Those apparatuses have character patterns stored therein, generate character patterns corresponding to character codes and display or print the patterns. The character patterns are typically bit-mapped when stored. For Kanji characters or the like which include many characters, the bit-mapping of the individual character patterns increases the memory capacity, so that a method of storing characters of an outline (contour line) format is becoming popular.

This outline system is advantageous over the bit-mapping system in data compression. Even this outline system inevitably needs an increased memory capacity in order to meet the recent demand of accomplishing a greater number of characters and multi-typefaces.

As shown in FIG. 1A, a Kanji character "Mori" is broken down to three partial patterns or elements 1, 2 and 3, each having a continuous shape of a character pattern. A Kanji character "Kuri," shown on the left-hand side in FIG. 1B, is broken down to two elements 1 and 2. Further, a Kanji character "Kin," shown on the right-hand side in FIG. 1B, is broken down to three elements 1, 2 and 3.

As apparent from those diagrams, the upper element "Ki" (element 1) of the Kanji character "Mori" in FIG. 1A has the same shape as the lower element "Ki" (element 1) of the Kanji character "Kuri" in FIG. 1B. The lower two elements "Ki" (elements 2 and 3) of the Kanji character "Mori" in FIG. 1A have the same shape as the upper two elements "Ki" (elements 1 and 2) of the Kanji character "Kin" in FIG. 1B.

Therefore, those Kanji characters can share the shapes of some elements. In other words, the shape of one element can be used in a plurality of Kanji characters to reduce the amount of data needed to store Kanji characters.

As shown in FIG. 2A, the element "Ki" (element 1) of the Kanji character "Mori" can be broken down to strokes 1, 2, 3 and 4, such as a horizontal stroke "–" drawn in one stroke. This stroke segmentation system, which accomplishes the common use of such strokes in a character, can allow strokes or partial patterns to be shared by a plurality of characters. The stroke 1 can further be broken down to parts 1, 2 and 3 (left end, center part and right end) as shown in FIG. 2B. This part segmentation system, which accomplishes the common use of such parts in a character, can permit such parts to be used by a plurality of characters.

This system of dividing a character into a plurality of parts and allowing such parts to be shared by a plurality of characters is disclosed in, for example, Japanese Unexamined Patent Publication No. sho 64-75260. This method requires the positions of the start points of parts (strokes) for each character. With the absolute coordinate origin p of the body of a character taken at the lower left corner, the position of the start point (hereinafter simply referred to as "start position") of each partial pattern is represented by an offset (start vector a) to the start point of that partial pattern from the origin, as shown in FIG. 3. The start vector is indicated by X and Y coordinates from the origin set as (0, 0). For a character having a body size of 1024×1024, the X and Y coordinates each require data of two bytes, a total of four bytes.

This will be described with reference to the case of dividing the Kanji character "Mori" in FIG. 2A and the Kanji character "Kuri" in FIG. 2B into strokes. As shown in FIG. 4, to permit the contour data of individual strokes A, B, C and D of one element "Ki" to be shared by both Kanji characters "Mori" and "Kuri," the start positions Ax1 to Dx1 and Ay1 to Dy1 of the individual strokes A, B, C and D for the Kanji character "Mori" requires 16 bytes while the start positions Ax2 to Dx2 and Ay2 to Dy2 of those strokes A, B, C and D for the Kanji character "Kuri" requires 16 bytes. Therefore, the data of the start positions requires a total of 32 bytes to allow the stokes of the element "Ki" to be shared by both Kanji characters "Mori" and "Kuri."

Recently, high resolution (e.g., 300 dpi) is demanded, and larger body sizes are required to express characters clearer while meeting the demand for multi-typefaces. For example, the character coordinate system for characters is set equal to or greater than 256×256 dots, and there are demands for multi-typefaces and a larger number of characters. The prior art therefore raises the following problems.

According to the system of expressing the start position of each partial pattern from the position of the origin (hereinafter referred to as "origin position") by character coordinate system, the coordinate data of the start position of each partial pattern always needs four bytes. Like the stroke segmentation system and the part segmentation system, therefore, as the number of partial patterns increases, the amount of data of the start positions increases while the reduction of the amount of data is limited. The number of start points increases in the stroke segmentation system and the part segmentation system and the amount of data will not be reduced desirably, unlike in the system which does not divide a character pattern into parts, unless the sharing ratio of partial patterns is high.

SUMMARY OF THE INVENTION

It is therefore a primary object of the present invention to provide a character generating method and apparatus which are designed to reduce the amount of data needed to generate character patterns.

It is another object of the present invention to provide a character generating method and apparatus which compact data for display of the start points of partial patterns constituting each character pattern to generate the character pattern.

It is a further object of the present invention to provide a character generating method and apparatus which compact data for display of the start points of partial patterns constituting each character pattern even when the partial patterns are broken down into finer portions, and generate the character pattern.

To achieve the above objects, according to one aspect of the present invention, there is provided a character generating method for arranging a plurality of basic patterns constituting each of a plurality of partial patterns constituting a character pattern at respective absolute start positions to form the plurality of partial patterns, thereby generating the character pattern, which method comprises the steps of storing origin position data of the partial patterns in a partial-pattern coordinate system, set by a character coordinate system, start position data of the basic patterns in said partial-pattern coordinate system and shape data of the basic patterns; reading the origin position data of those individual partial patterns constituting a desired character pattern and the start position data of those basic patterns constituting the partial patterns; computing the absolute start positions of the basic patterns from the read origin position data and start position data; and arranging the basic patterns, defined by the shape data, at the respective absolute start positions to generate the desired character pattern.

According to another aspect of the present invention, there is provided a character generating apparatus for arranging a plurality of basic patterns constituting each of a plurality of partial patterns constituting a character pattern at respective absolute start positions to form the plurality of partial patterns, thereby generating the character pattern, which apparatus comprises a common file for storing origin position data of the partial patterns in a partial-pattern coordinate system, set by a character coordinate system, and start position data of the basic patterns in the partial-pattern coordinate system; an individual file for storing shape data of the basic patterns; and a character generating circuit for computing the absolute start positions of the basic patterns from the origin position data of a desired character and the associated start position data in the common file, and arranging the basic patterns, defined by the shape data, in the individual file at the respective absolute start positions to generate the character pattern of the desired character.

According to those two aspects, for each basic pattern, such as a stroke or a part, the origin position of partial pattern like an element or a stroke, is set in the character coordinate system instead of setting the absolute start position in the character coordinate system, and this basic pattern is indicated by the coordinate system of the partial pattern.

In this manner, although the origin position of a partial pattern requires four bytes as it is the absolute position in the character coordinate system, the indication of the start position of a basic pattern simply requires almost two bytes. In the case of the Kanji characters shown in FIG. 3, for example, the origin position of the partial pattern (element 1) "Ki" needs four bytes, and the start position of each of the four strokes constituting the element 1 needs two bytes, thus a total of four bytes for the four strokes. Therefore, the present system requires just a total of 12 bytes, ¾ of the amount of data required by the prior art which is 16 bytes. For Kanji characters including about 7,000 characters, the present invention can significantly reduce the amount of data, thus saving the memory capacity accordingly.

According to a further aspect of the present invention, there is provided a character generating method for arranging a plurality of basic patterns constituting each of a plurality of partial patterns constituting a character pattern at respective absolute start positions to form the plurality of partial patterns, thereby generating the character pattern, which method comprises the steps of storing origin position data of the partial patterns in a partial-pattern coordinate system, set by a character coordinate system, start position data of skelton patterns of the partial patterns in the partial-pattern coordinate system, offset data of each of the skelton patterns of the associated basic patterns from an associated start point, and shape data of the basic patterns; reading the origin position data of those individual partial patterns constituting a desired character pattern, the start position data of those skelton patterns constituting the partial patterns and the offset data of the basic patterns; computing the absolute start positions of the basic patterns from the read origin position data, start position data and offset data; and arranging the basic patterns, defined by the shape data, at the respective absolute start positions to generate the desired character pattern.

According to a still further aspect of the present invention, there is provided a character generating apparatus for arranging a plurality of basic patterns constituting each of a plurality of partial patterns constituting a character pattern at respective absolute start positions to form the plurality of partial patterns, thereby generating the character pattern, which apparatus comprises a common file for storing origin position data of the partial patterns, set by a character coordinate system, in the character coordinate system, and start position data of skelton patterns of the partial patterns in the character coordinate system; an individual file for storing offset data of each of the skelton patterns of the associated basic patterns from an associated start point, and shape data of the basic patterns; and a character generating circuit for computing the absolute start positions of the basic patterns from the origin position data of those individual partial patterns constituting a desired character pattern, the start position data of those skelton patterns constituting the partial patterns and the offset data of the basic patterns, and arranging the basic patterns, defined by the shape data, at the respective absolute start positions to generate the desired character pattern.

According to those latter two aspects, the basic patterns are skelton patterns common to different typefaces, so that common basic patterns can be used for Kanji characters of different typefaces, such as Mincho and Gothic. It is therefore possible to easily generate characters of individual typefaces.

Other features and advantages of the present invention will be readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention.

DETAILED DESCRIPTION OF THE PREFERRED EMBODIMENTS

Figure 1A:
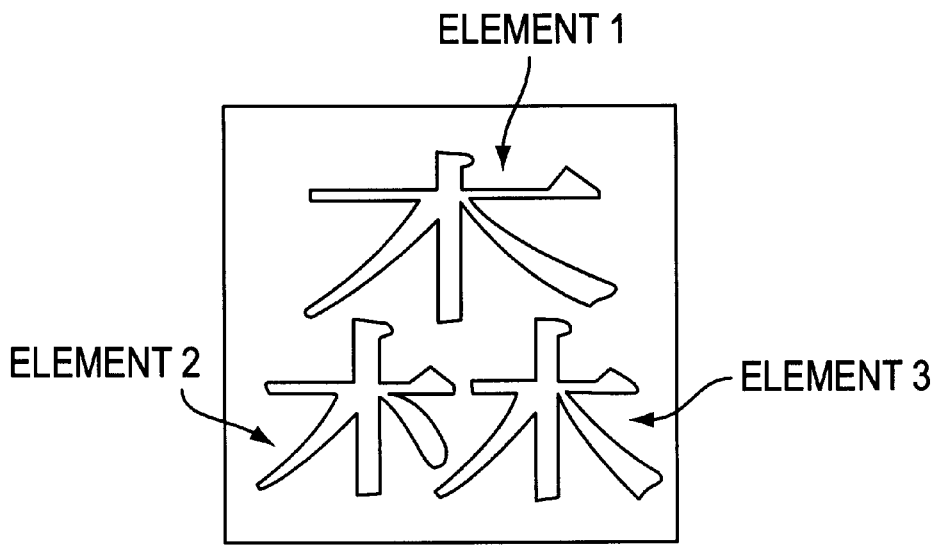
FIGS. 1A and 1B are diagrams for explaining how to divide a Kanji character into elements.
Figure 1B:
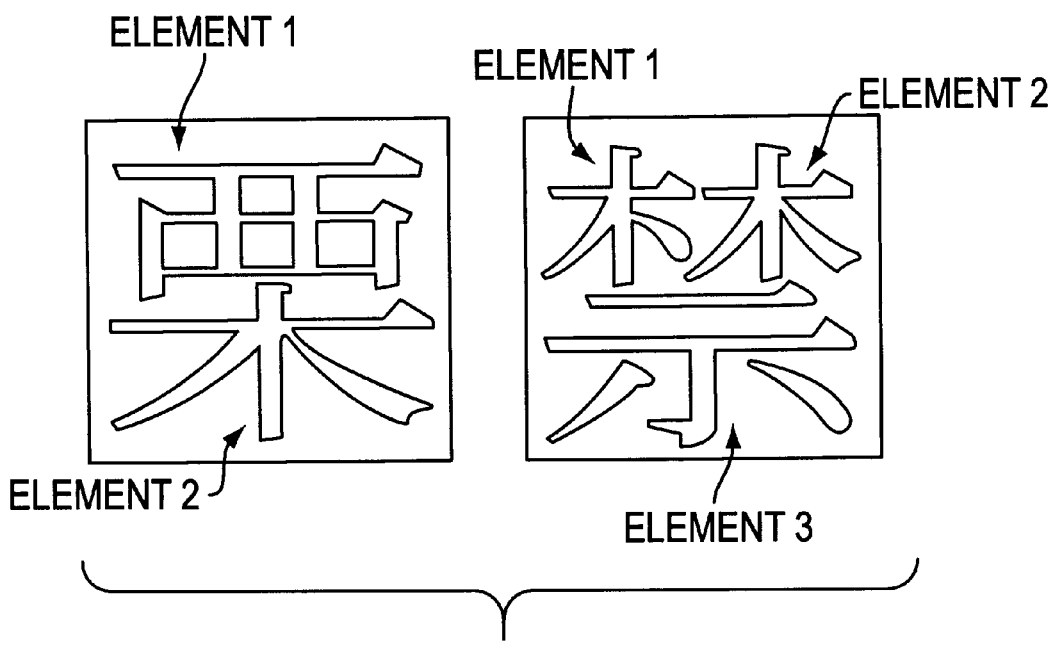
Figure 2A:
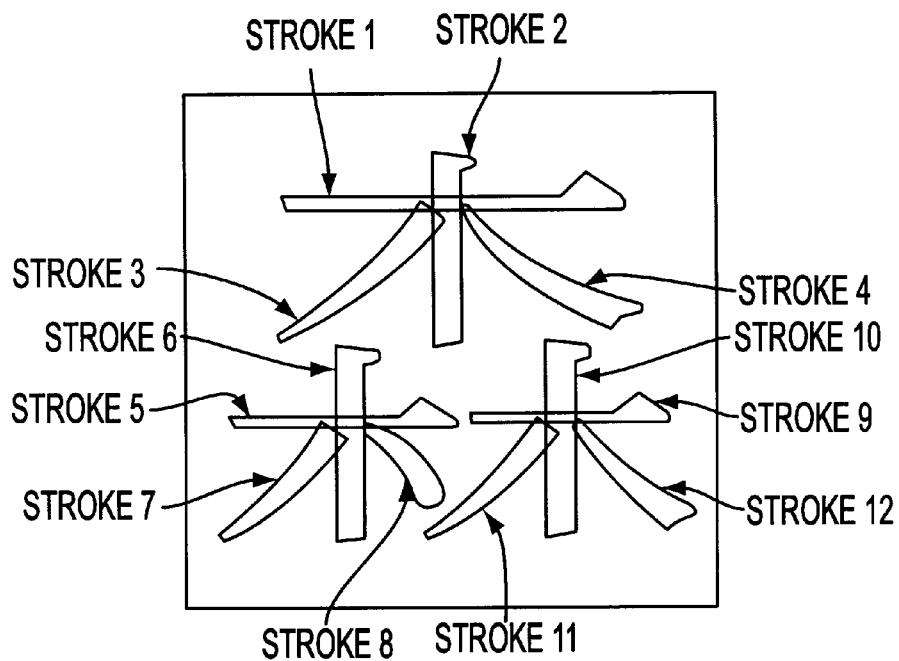
FIG. 2A is a diagram for explaining how to divide the elements of a Kanji character into strokes.
Figure 2B:
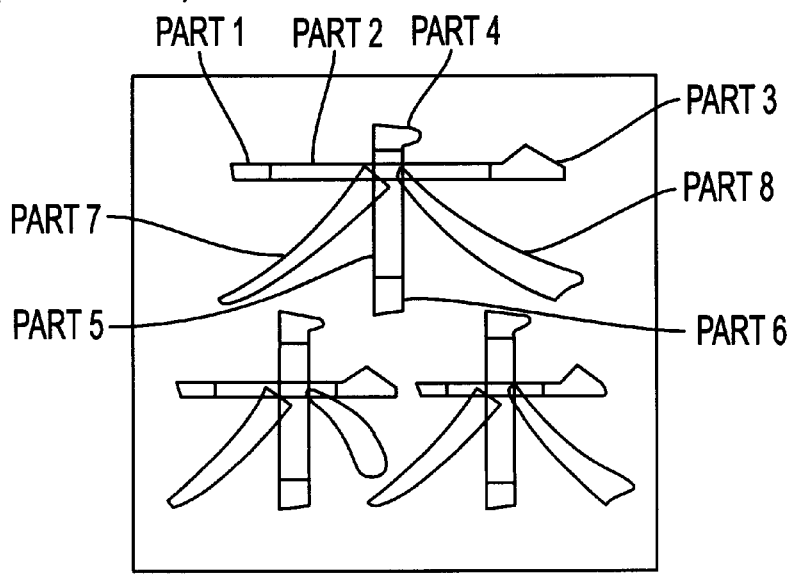
FIG. 2B is a diagram for explaining how to divide the strokes of a Kanji character into parts.
Figure 3:
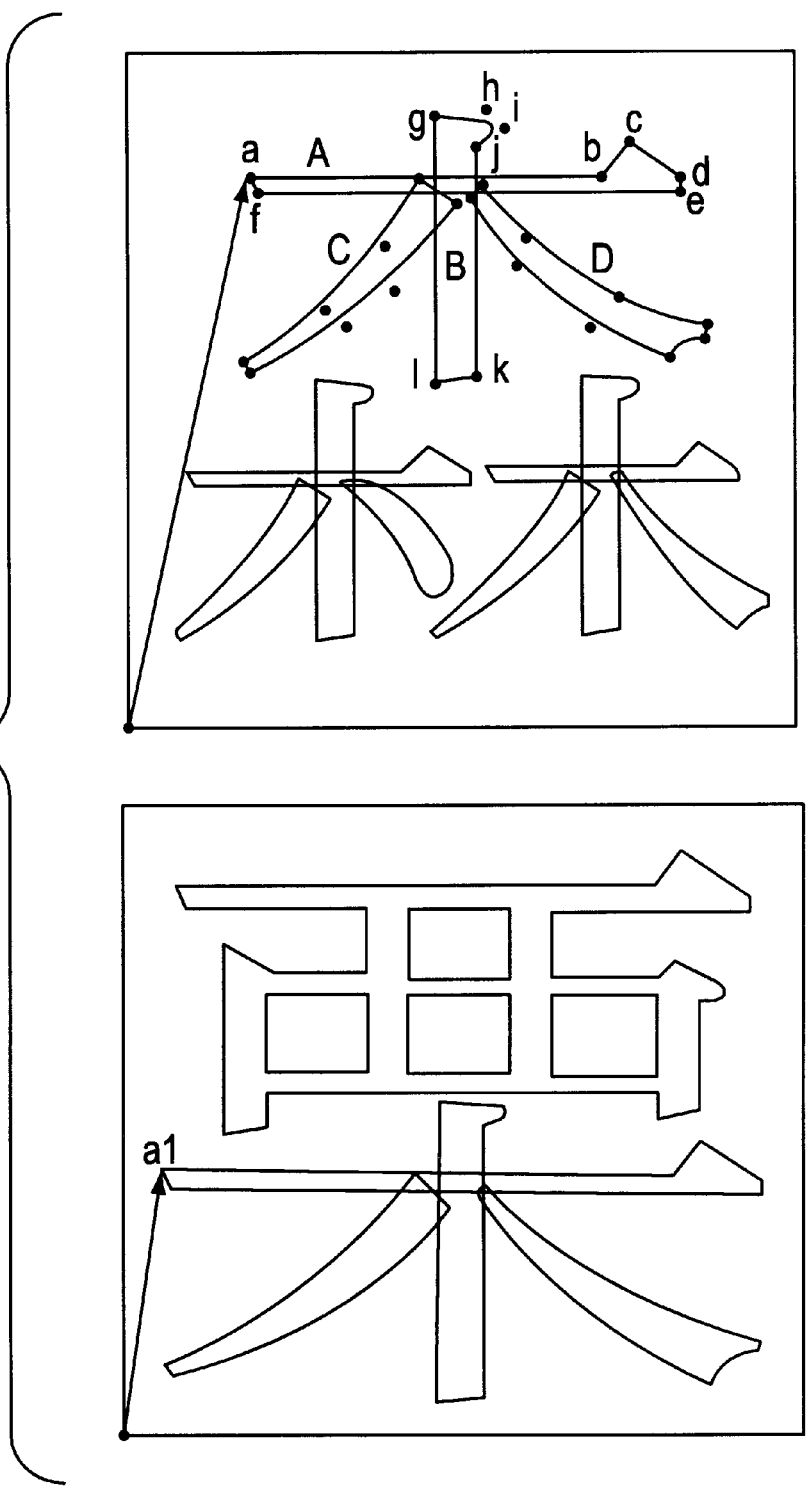
FIG. 3 is a diagram for explaining a conventional way of taking coordinates of each start point.
Figure 4:
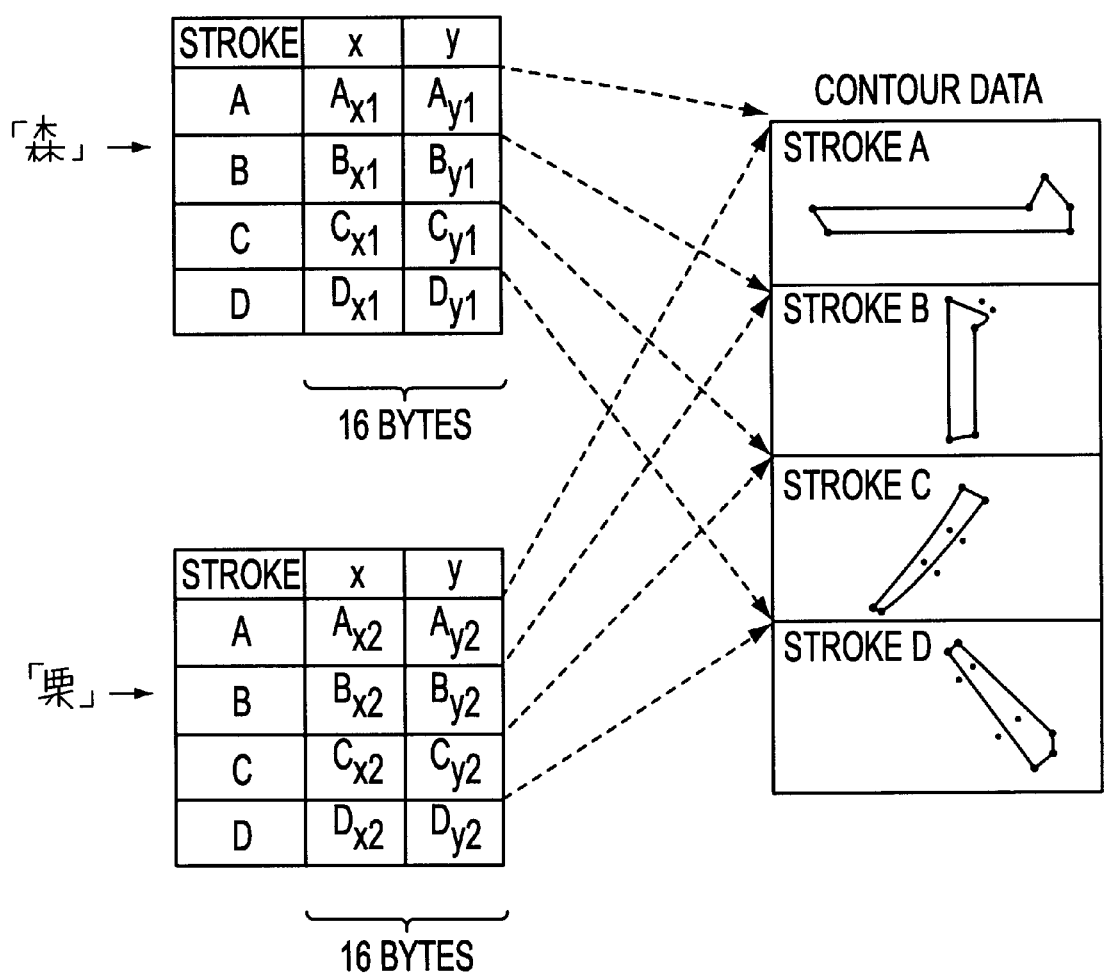
FIG. 4 is a diagram for explaining start position data according to prior art.
Figure 5A:
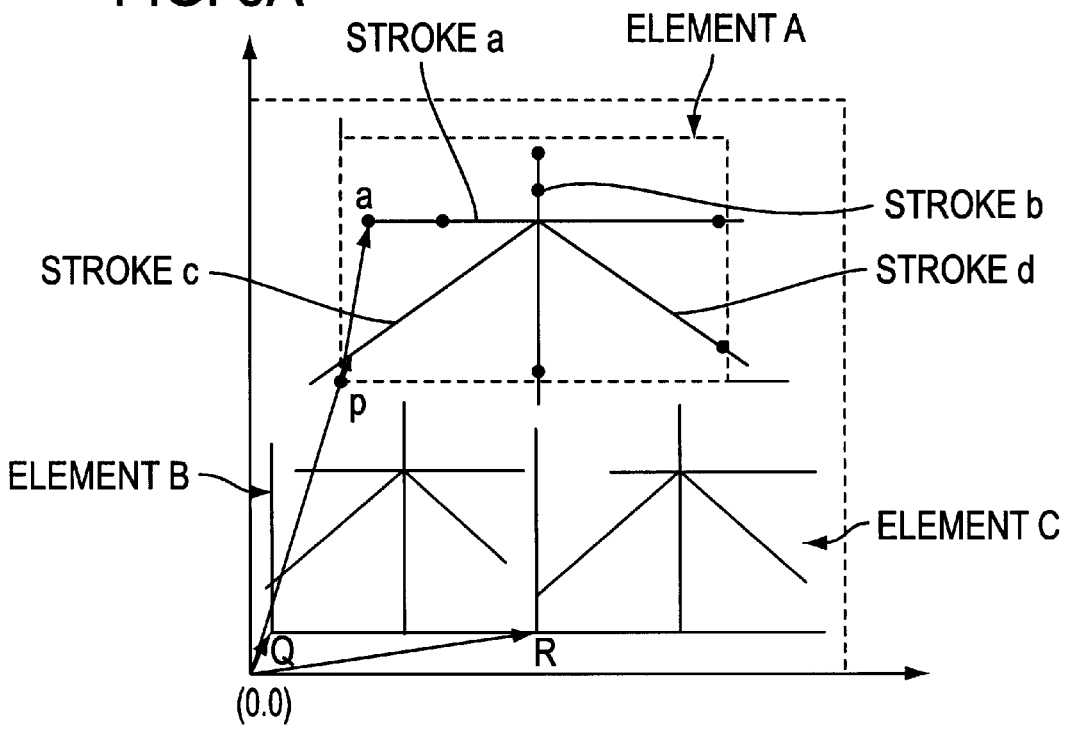
FIG. 5A is a diagram illustrating the principle of the present invention.
Figure 5B:
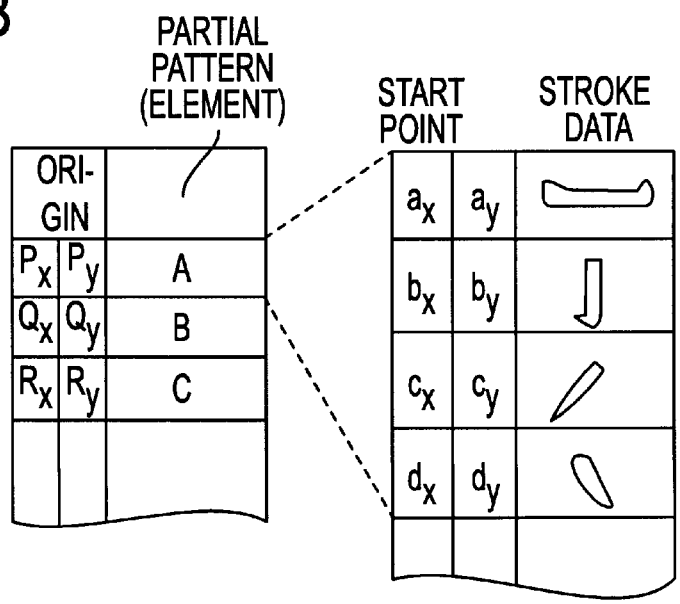
FIG. 5B is a diagram for explaining start position data in the case of FIG. 5A.

FIGS. 5A and 5B are diagrams for explaining start position data in a stroke segmentation method. As shown in FIG. 5A, the upper element A of a Kanji character "Mori" consists of four strokes. The origin position of this element A is expressed by a vector (px, py) from the origin (0, 0) in the character coordinate system to an origin p in the element coordinate system, as shown in FIG. 5B. The start positions of individual strokes a, b, c, and d are expressed by vectors (ax, ay), (bx, by), (cx, cy) and (dx, dy) from the position p taken as the origin (0, 0) in the element coordinate system to the start positions of those strokes a, b, c and d.

While the origin of the element A is in the character coordinate system, the coordinates of each stroke are defined by the element coordinate system smaller than the character coordinate system. The coordinates of each stroke therefore simply need about two bytes. Therefore, the amount of coordinate data of the start positions can be reduced.

Figure 6:
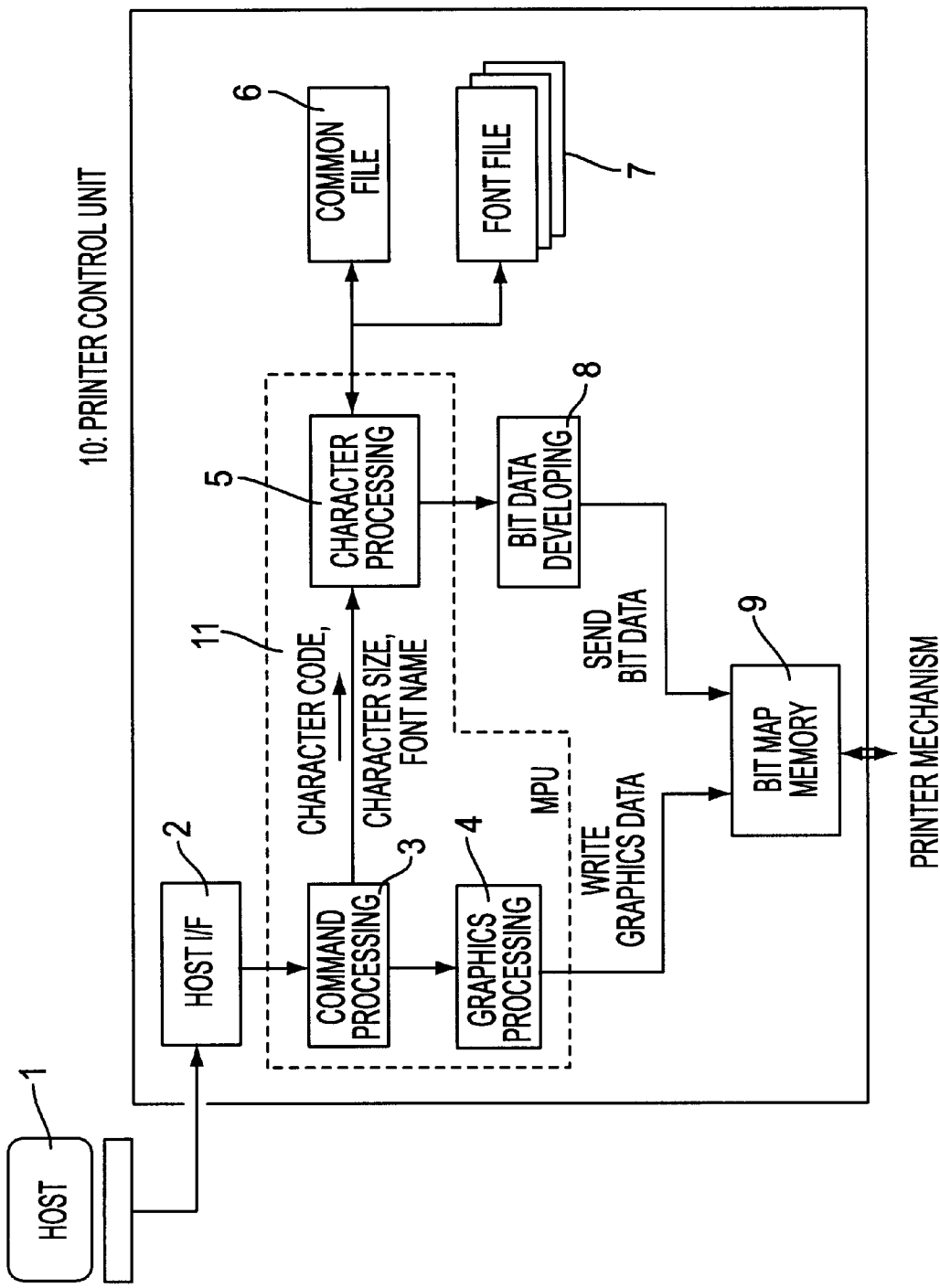
FIG. 6 is a block diagram of one embodiment of this invention.

FIG. 6 presents a block diagram of a printer control unit according to one embodiment of the present invention.

In FIG. 6, a host machine 1, constituted of a personal computer, a word processor or the like, sends print data to a printer control section 10. The printer control unit 10, which is connected to the host machine 1 and a printer mechanism (not shown), prepares print data and sends it to the printer mechanism in accordance with an instruction from the host machine 1.

The printer control unit 10 includes a host interface circuit 2, a command processing circuit 3, a graphics processing circuit 4, and a character processing circuit 5.

The host interface circuit 2 controls an interface with the host machine 1. The command processing circuit 3 discriminates if the print data from the host machine 1 is graphics data or character data.

The graphics processing circuit 4 prepares bit data of a figure in accordance with the graphics data from the command processing circuit 3. The character processing circuit 5 reads the necessary origin position, start points, and typeface data specific to a typeface from a common file 6 and a font file 7 (both will be described later) in accordance with the character data (character code, character size and font name), and prepares character data of an outline format.

The common file 6 stores information common to typefaces of each character (data of common origin, data of start points, etc.). The font file 7 stores typeface data specific to the individual typefaces. A bit data developing circuit 8, which is constituted of an outline font generator (MB89412, a product of Fujitsu Limited), develops character data of an outline format into character bit data. A bit map memory 9 is a memory in or from which graphics bit data and character bit data are written or read out, and the read-out data is output to the printer mechanism (not shown) to be printed.

The command processing circuit 3, graphics processing circuit 4 and character processing circuit 5 are constituted of a single microprocessor (MPU) 11, and those sections 3, 4 and 5 show the programs the microprocessor 11 runs as blocks.

A detailed description will now be given of the common file 6. A character consists of continuous partial patterns and can be divided into elements belonging to a radical, a right-hand radical, etc. This element is further divided into strokes determined by the brush moving. The stroke can be broken down into parts, such as a left end portion, a straight portion and a right end portion, which show design features a brush can create.

As a character is divided hierarchically, the number of partial patterns common to characters gradually increases, thus ensuring a reduction in memory capacity accordingly.

Figure 8:
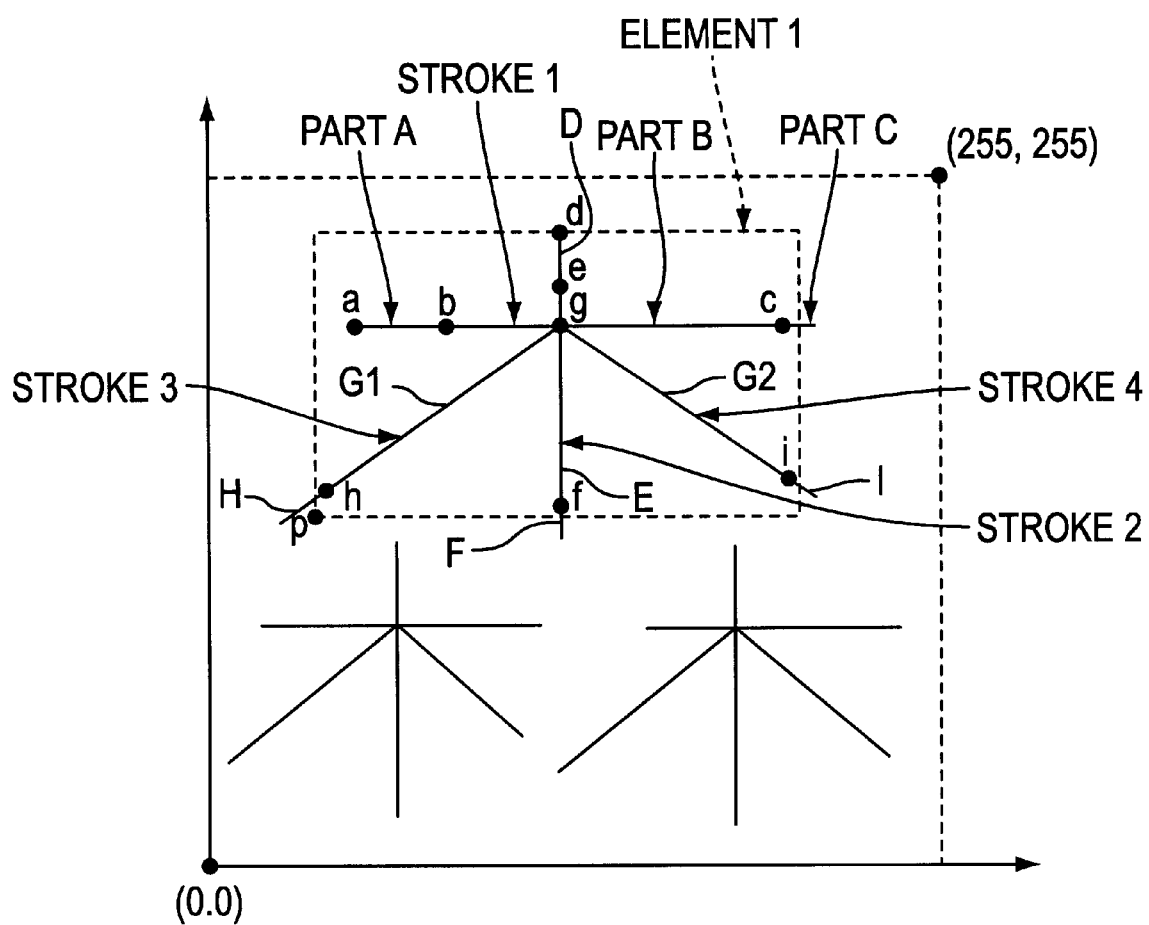
FIG. 8 is a diagram for explaining data in the common file in FIG. 7A.
Figure 9:
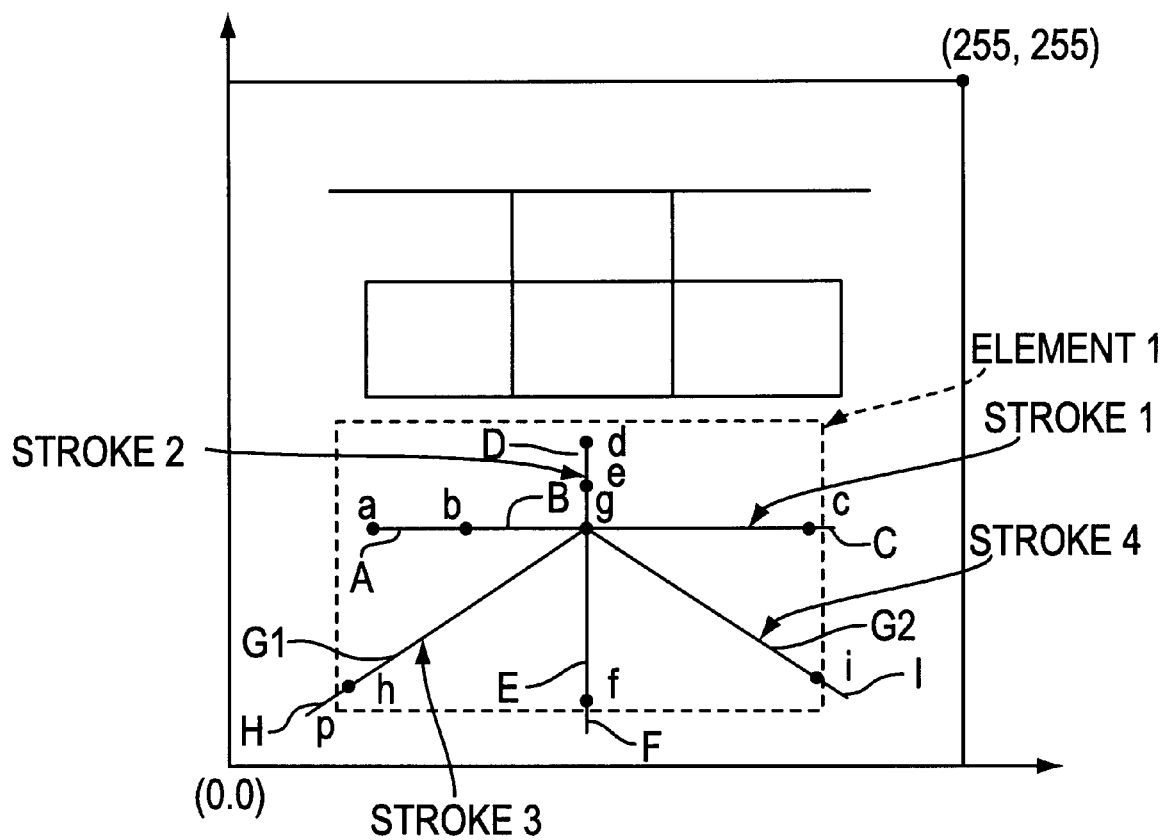
FIG. 9 is a diagram for explaining another data in the common file in FIG. 7A.

FIGS. 8 and 9 respectively show the Kanji characters "Mori" and "Kuri" broken down into parts. For the element "Ki" (element 1) of the Kanji character "Mori" in FIG. 8 and the Kanji character "Kuri" in FIG. 9, the horizontal stroke 1 is broken down to three parts: a left end A, a straight stroke B and a right end C. Likewise, the vertical stroke 2 is broken down to three parts of an upper end D, a straight stroke E and a lower end F. The leftward diagonal stroke 3 is broken down to two parts of a diagonal stroke G1 and an end part H, and the rightward diagonal stroke 4 do two parts of a diagonal stroke G2 and an end part I.

For this element "Ki," the element origin position p is set in the character coordinate system, and the skeleton start positions of the individual parts are set as a, b, c, d, e, f, g, h and i in the element coordinate system. In this example, the element origin position and the part start positions are set in the coordinate system of 256×256 dots, which is ¼ of the character size of 1024×1024 dots, so that only one byte is needed for each of the coordinates of the origin position and the X and Y coordinates of each start position.

Since the element origin position of an element is arbitrarily selectable, the element origin position need not be expressed by the resolution of the character coordinate system. Thus, the element origin position is expressed by the coordinate system whose size is 1/n (¼ in this example) of the character coordinate system. The element origin position expressed in this smaller coordinate system is multiplied by n to be transformed to the absolute position coordinates in the character coordinate system.

Since the start positions of the individual parts of an element are also arbitrarily selectable, the start positions need not be expressed by the resolution of the character coordinate system. Thus, those part start positions are expressed by the coordinate system whose size is 1/n (¼ in this example) of the character coordinate system. The part start positions expressed in this smaller coordinate system are multiplied by n to be transformed to the absolute position coordinates in the character coordinate system.

Figure 7A:
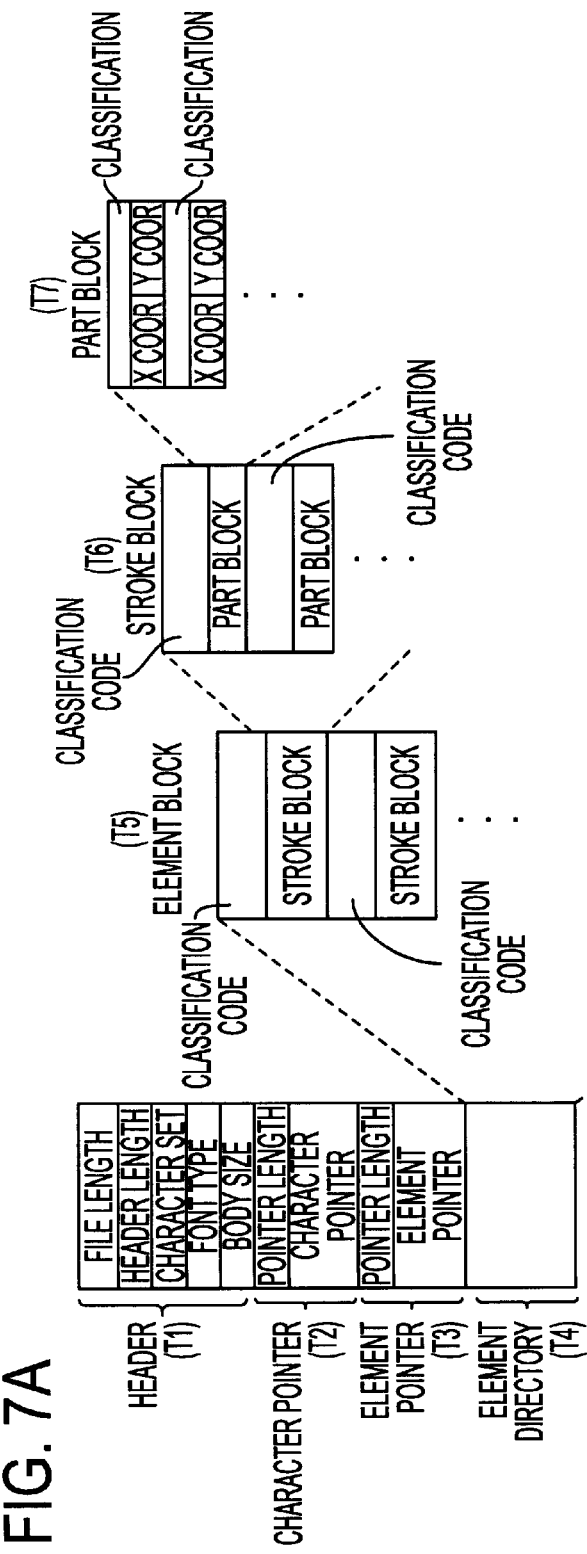
FIG. 7A is a diagram showing the structure of a common file in FIG. 6.

As shown in FIG. 7A, the common file 6 that stores the element origin position and the part start positions includes a header block T1, which consists of a file length, a header length, a character set, font types and body sizes, a character pointer block T2 consisting of a pointer length and character pointers, an element pointer block T3 consisting of a pointer length and element pointers, and an element directory T4.

Figure 7B:
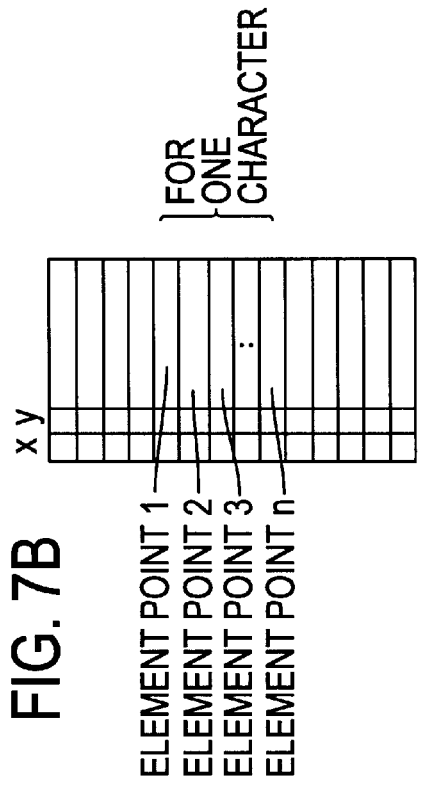
FIG. 7B is a diagram showing the structure of an element pointer in FIG. 7A.

As shown in FIG. 7B, the element pointer block T3 holds the coordinates of the element origin position (X, Y) of each element, expressed in the character coordinate system in association with the element pointer which indicates that element (e.g., "Ki").

As shown in FIG. 7A, the element directory T4 includes element blocks T5 each constituting an associated character. Each element block T5 consists of classification codes of elements which constitute one character, and stroke blocks T6 each indicating strokes which constitute one element. Each stroke block T6 consists of classification codes of the individual strokes and part blocks T7 each indicating parts which constitute one stroke. Each part block T7 consists of classification codes of the individual parts and coordinates X and Y of the part start positions of the parts, expressed in the element coordinate system.

Figure 10:
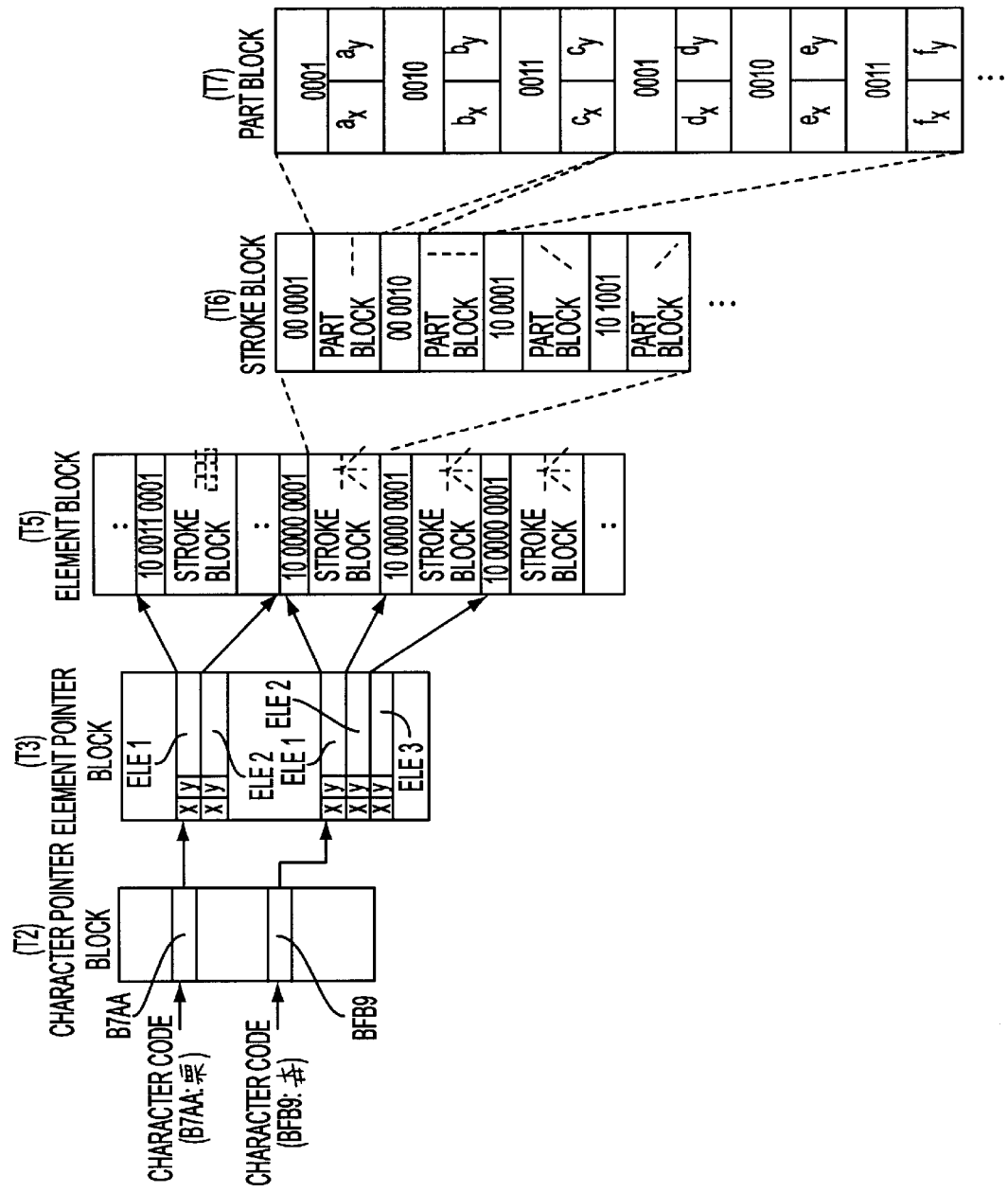
FIG. 10 is a diagram showing a specific example of the common file in FIG. 7A.

FIG. 10 shows the common file 6 for, for example, Kanji characters shown in FIGS. 8 and 9. That element pointer block T3 which corresponds to the character code "B7AA" of the Kanji character "Kuri" holds two elements "Nishi" and "Ki" and their origin coordinates (X, Y) in the character coordinate system. That element pointer block T3 which corresponds to the character code "BFB9" of the Kanji character "Mori" holds three elements "Ki" and their element origin coordinates (X, Y) in the character coordinate system. The element block T5 indicated by each element pointer block T3 contains the stroke block T6. The part blocks T7 are set in this stroke block T6. Set in each part block T7 are the part start positions of the individual parts, ax to fx and ay to fy, in the element coordinate system.

The Kanji characters "Kuri" and "Mori" can share data of the element "Ki" in this manner. The origin position p is set for this element "Ki" in the character coordinate system, and the part start positions ax–fx and ay–fy are set for the individual parts of the element "Ki" in the element coordinate system.

Figure 12:
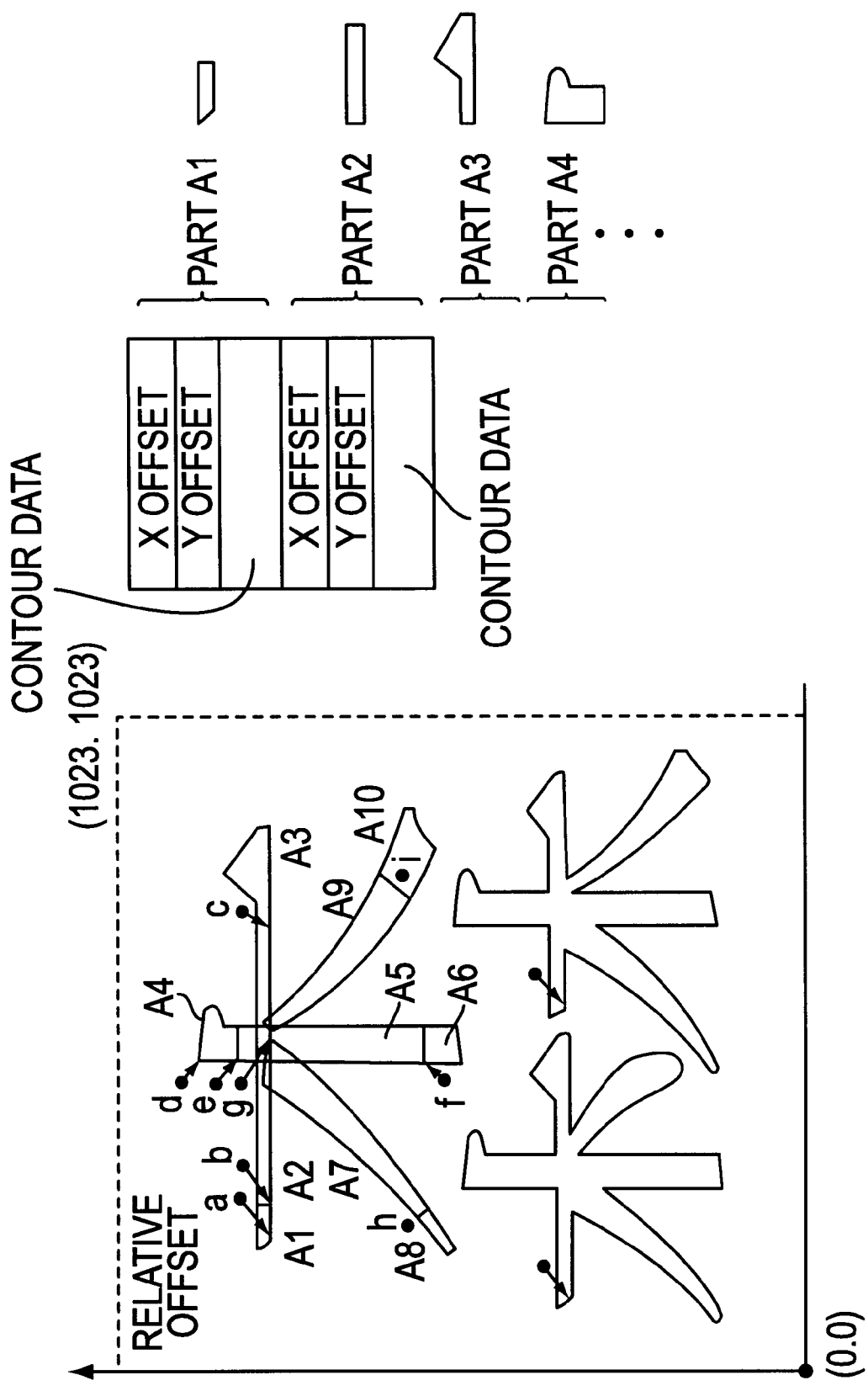
FIG. 12 is an explanatory diagram of a font file for Mincho Kanji characters.

The font file 7 will now be described. As shown in FIG. 12, the Mincho Kanji character "Mori" has only to be indicated by relative offsets (X offsets, Y offsets) from the common part start positions a, b, c, d, e, f, g, h and i, indicated by the black dots in the diagram, to the start positions of the parts A1, A2, A3, A4, A5, A6, A7 and A9, A8, and A10 in the coordinate system with a character body size of 1024×1024 dots.

For instance, the part A1 is constituted of the relative offsets (X offset, Y offset) from the part common start position a to the start position of the part A1, and the contour data of the part A1. This is the same for the other parts.

Figure 13:
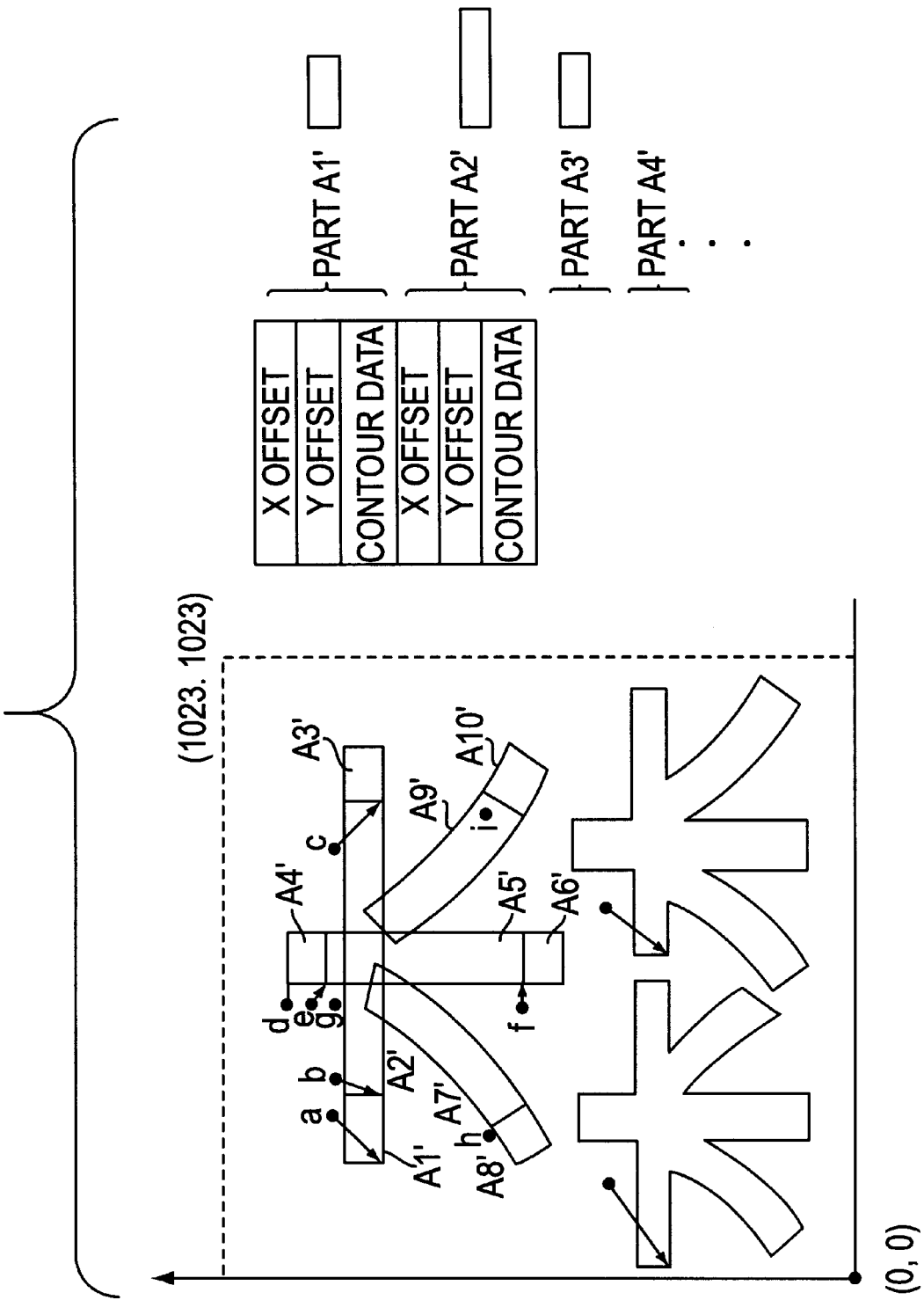
FIG. 13 is an explanatory diagram of a font file for Gothic Kanji characters.

Likewise, as shown in FIG. 13, the Gothic Kanji character "Mori" is indicated by relative offsets (X offsets, Y offsets) from the common part start positions a, b, c, d, e, f, g, h and i, indicated by the black dots in the diagram, to the start positions of the parts A1', A2', A3', A4', A5', A6', A7' and A9', A8', and A10' in the coordinate system with a character body size of 1024×1024 dots. For instance, the part A1' is constituted of the relative offsets (X offset, Y offset) from the common part start position a to the start position of the part A1', and the contour data of the part A1'. This is the same for the other parts.

Figure 11A:
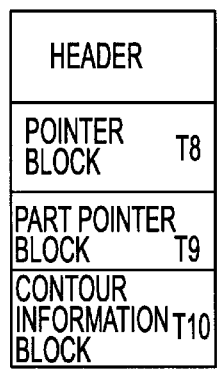
FIG. 11A is a diagram showing the structure of a font file in FIG. 6.
Figure 11B:
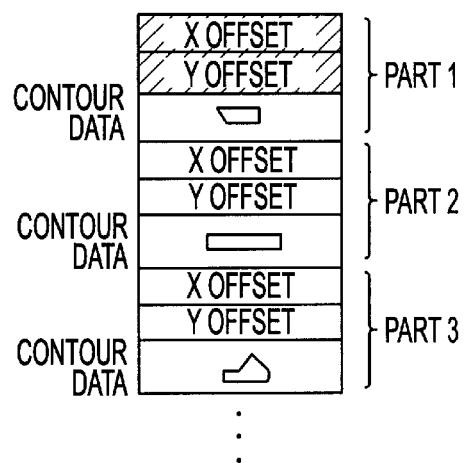
FIG. 11B is a diagram showing the structure of a contour information block in FIG. 11A.
Figure 11C:
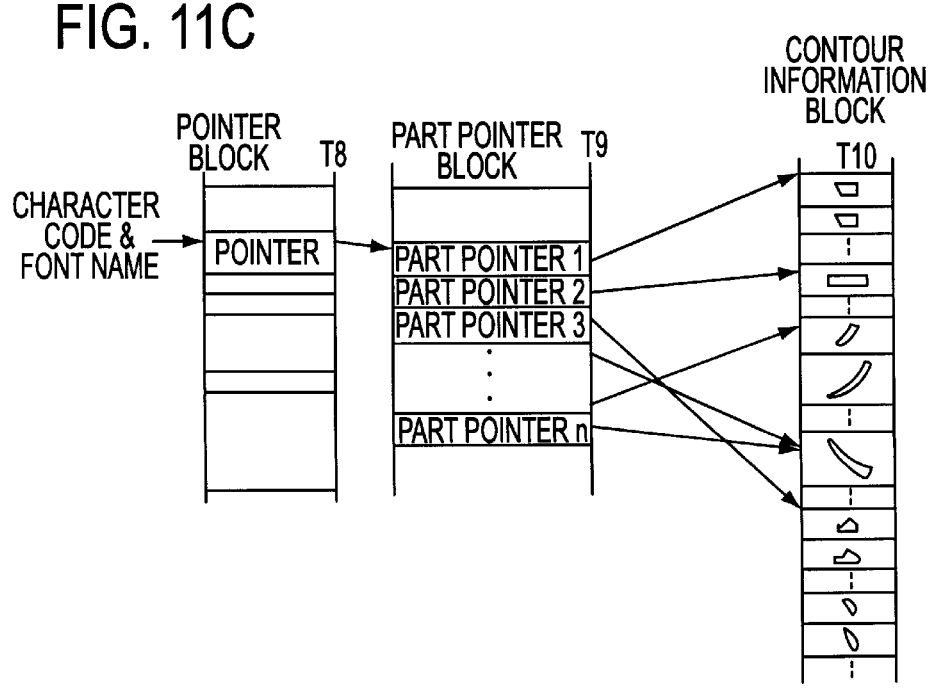
FIG. 11C is an explanatory diagram of a font file in FIG. 11A.
Figure 14:
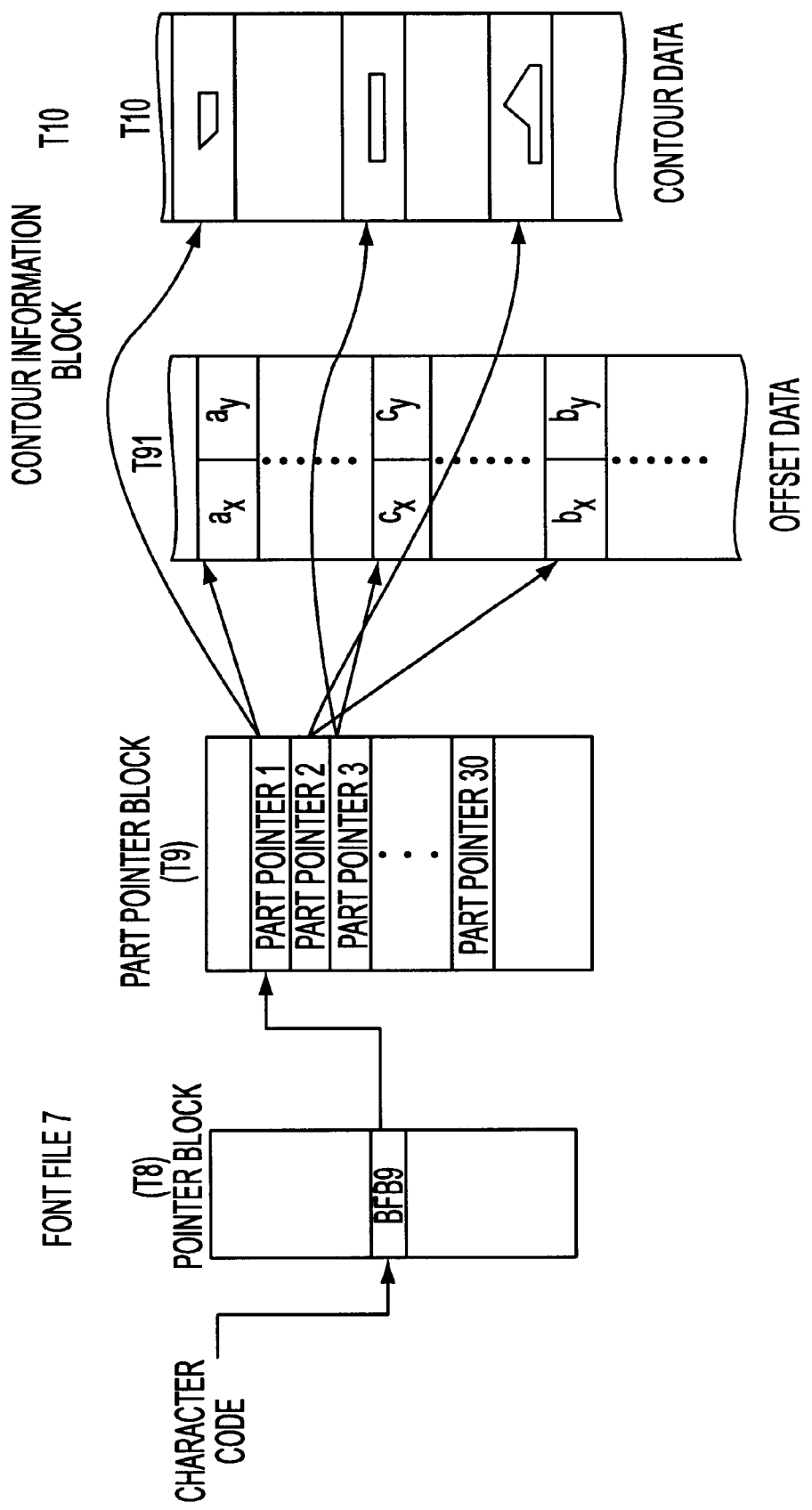
FIG. 14 is a diagram for explaining the operation using the font file in FIG. 11A.

The font file 7 includes a header, a pointer block T8, a part pointer block T9 and a contour information block T10, as shown in FIGS. 11A and 14. As shown in FIG. 11C, the pointer block T8 indicates the head address in the part pointer block T9, which corresponds to the character code and font name, and the part pointer block T9 indicates the addresses of the individual parts constituting the character in the contour information block T10 and the X offsets and Y offsets of the individual parts. As shown in FIG. 11B, the contour information block T10 consists of the contour data of the individual parts.

Figure 15:
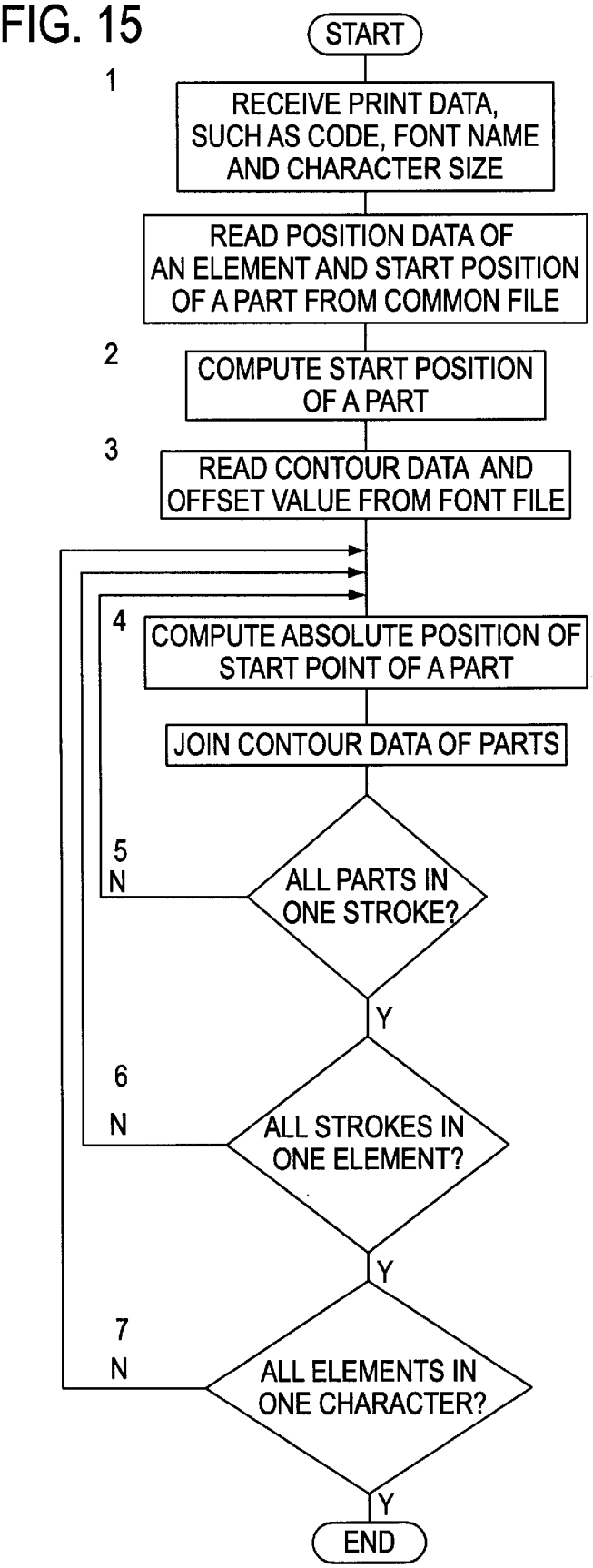
FIG. 15 is a flowchart illustrating a character developing routine according to one embodiment of this invention.

FIG. 15 illustrates a flowchart of the character developing process according to one embodiment of the present invention.

First, the host machine 1 sends print data to the printer control unit 10. This print data designates a typeface, a character, the size of the character and a figure.

The host interface circuit 2 decodes this print data and sends the decoded data to the command processing circuit 3. The command processing circuit 3 sends graphics print data to the graphics processing circuit 4 and character print data to the character processing circuit 5, respectively. The graphics processing circuit 4 develops the graphics data to graphics bit data and writes it into the bit map memory 9.

The character processing circuit 5 develops a character by a process shown in FIG. 15.

(1) The character processing circuit 5 reads the character code, the typeface name and the character size, and reads the element origin position data (character coordinate system) of the associated element and the common part start positions of the parts (element coordinate system) from the common file 6 based on the character code as explained above with reference to FIG. 10.

(2) Then, the character processing circuit 5 computes the skeleton start positions of the individual parts from the following equations.

$$\text{skeleton start position X} = \text{element origin position X} \times 4 + \text{common part start position X} \times 4$$
$$\text{skeleton start position Y} = \text{element origin position Y} \times 4 + \text{common part start position Y} \times 4$$

(3) The character processing circuit 5 then reads the associated part codes, offset values and contour data from the font file 7 based on the character code and the font name.

(4) Then, the character processing circuit 5 computes the absolute start positions of the individual parts from the following equations based on the skeleton start positions and offset values.

$$\text{absolute start position X} = \text{skeleton start position X} + \text{offset value X}$$
$$\text{absolute start position Y} = \text{skeleton start position Y} + \text{offset value Y}$$

The absolute start positions taken as the layout origins are written together with the contour data in the bit data developing circuit 8. When the character size is specified at this time, the coordinates are scaled down or up according to the character size.

(5) The character processing circuit 5 then determines if the above processing is complete for all the parts in one stroke referring to the associated stroke block T6 in the common file 6. If the processing has not been completed, the character processing circuit 5 returns to step (4).

(6) If the above processing is complete for all the parts in one stroke, the character processing circuit 5 then determines if the processing is complete for all the strokes in one element referring to the associated element block T5 in the common file 6. If the processing has not been completed, the character processing circuit 5 returns to step (4).

(7) If the above processing is complete for all the strokes in one element, the character processing circuit 5 then determines if the processing is complete for all the elements of one character referring to the element directory T4 in the common file 6. If the processing has not been completed, the character processing circuit 5 returns to step (4). If the processing is complete, on the other hand, the character processing circuit 5 terminates the developing process for one character.

Then, the bit data developing circuit 8 describes the contour from the given layout origins according to the contour data, fills the inside of the contour, and produces a character pattern. The bit developing circuit 8 then writes that pattern into the bit map memory 9. When one page of bit data is written in the bit map memory 9, that one page of bit data is sent to the printer mechanism to be printed.

The above will be explained with reference to the Kanji character "Mori" shown in FIGS. 10 and 14. Upon reception of the character code (JIS code is "BFB9" for the Kanji character "Mori" in this example), the pointer block T2 in the common file 6 specifies the origin position (X, Y) of the elements constituting the Kanji character "Mori" in the element pointer block T3, and the head address of those elements in the associated element block T5. The origin positions of the elements are expressed in the character coordinate system of a size of 255×255.

The element block T5 has element codes and the stroke blocks T6 constituting the elements. As the Kanji character "Mori" is constituted of three elements "Ki," there are three element codes for "Ki" and three stroke blocks, and the elements are arranged according to the stroke order. Each stroke block T6 has stroke codes and data (part blocks T7) about the parts which constitute the individual strokes.

As the first element "Ki" of the Kanji character "Mori" is constituted of four strokes, the first stroke block T6 has four stroke codes (horizontal stroke, vertical stroke, Hidari-Harai (leftward curved stroke) and Migi-Harai (rightward curved stroke)), and part blocks T7 for each stroke. The strokes are also arranged according to the stroking order.

Each of the part blocks T4, which are located in each stroke block T3, contains data of parts constituting the associated stroke and data of the start positions of those parts. With regard to the first stroke of the element "Ki," the horizontal stroke consists of three parts, namely, a start portion (point a), a middle portion (point b) and a end portion (point c) (see FIG. 12 for example), and has their part codes and start positions (X, Y). The coordinates of the start positions are expressed in the 255×255 coordinate system as mentioned earlier, and the parts are arranged in the stroking direction.

Thus, the part blocks for the Kanji character "Mori" contain a total of 30 part codes and their start positions, which are arranged according to the stroking order.

When the font file 7 receives the typeface name and character code, as shown in FIG. 14, the associated pointer block T8 specifies the top address of part pointers in the part pointer block T9 for the parts constituting the typeface of the Kanji character "Mori." For each character, the part pointer block T9 contains the same number of part pointers and offset values (relative offsets) X and Y as the number of the parts which constitute that character.

As the Kanji character "Mori" consists of 30 parts, the part pointer block T9 has 30 part pointers for that character consecutively arranged according to the stroking order. That is, the part pointer for the stoking start portion of the first stroke comes first, followed by the part pointer of the stroking sustain portion and the part pointer of the stroking end portion of the first stroke in this order, next comes the part pointer for the stoking start portion of the second stroke, and so forth. This order is quite the same as the order of the associated parts in the common file 6.

Each part pointer specifies a location in the contour information block T10 which has contour data of the associated part. Each offset value indicated by a part pointer is expressed by an offset value from the absolute part start position of each part in the common file 6. For instance, the offset value indicated by the part pointer 1 is an offset value (relative offset) from the point a in the common file 6.

When the element origin position and the common part start positions in the common file 6 and the offset values for each typeface in the font file 7 are read in this manner, the absolute part start positions of the individual parts are computed and the parts are written at the respective absolute start positions according to the contour data of those parts, generating the associated character.

As apparent from the above, the part segmentation system is employed, the origin of each element is set in the character coordinate system, and the start positions of the individual parts are set by the element coordinates. In the case of a Kanji character "Mori" having 1024×1024 dots, therefore, 6 bytes are needed for the origin coordinates of the three elements (one byte each origin coordinate of each element), 60 bytes are needed for the common start positions X and Y of the 30 parts (one byte for each position X or Y of each part), and 60 bytes are needed for offset values X and Y for the 30 parts for each typeface (one byte for each offset value X or Y of each part). In the case of three typefaces, therefore, the part start point data needs just 66 bytes, which are considerably smaller than the conventionally-required 120 (4 bytes×30 parts) bytes.

Since the frame start points of parts are set in this example, a single piece of start point data is sufficient for multi-typefaces, so that the amount of data needed for an apparatus having multi-typeface characters set therein can further be reduced.

Figure 16A:
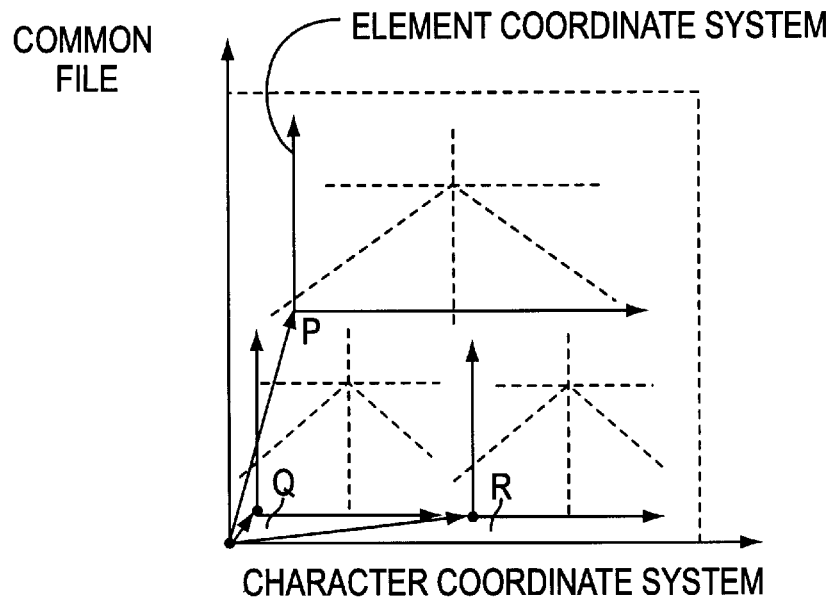
FIGS. 16A and 16B are diagrams for explaining start positions according to another embodiment of this invention.
Figure 16B:
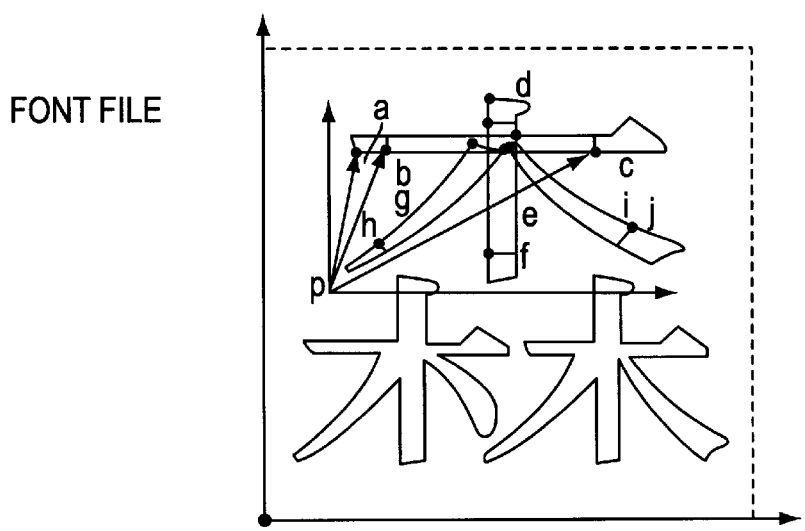
Figure 17A:
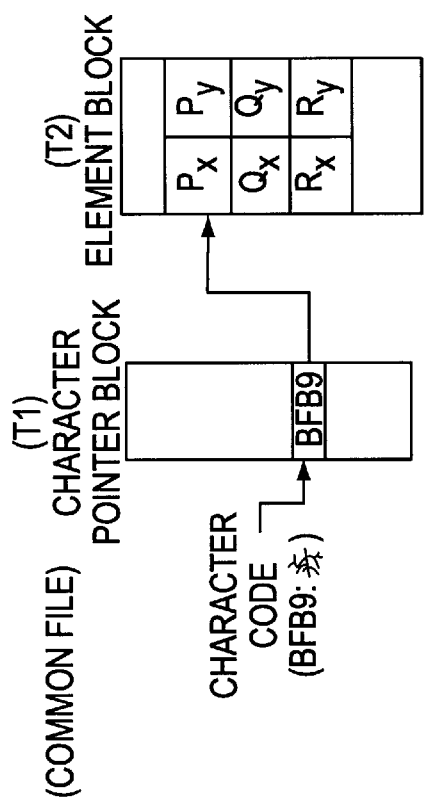
FIGS. 17A and 17B are diagrams for explaining the data structure according to this embodiment.
Figure 17B:
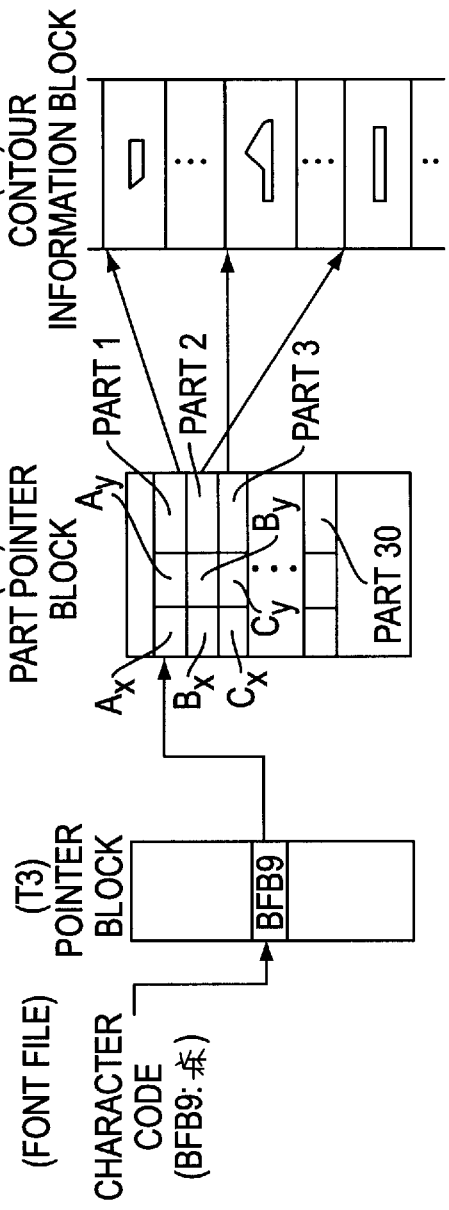

A modification of this invention will now be described referring to FIGS. 16A, 16B and 17. In this example, as shown in FIG. 16A, the common file 6 holds the position coordinates (Px, Py), (Qx, Qy) and (Rx, Ry) of the element origins P, Q and R (which are set in the character coordinate system) of the individual elements. The font file 7 contains the position coordinates (ax, ay), (bx, by), . . . of the start positions a, b, . . . of the individual parts. In other words, the skeleton start point data of the parts shown in FIGS. 7A through 14.

With this design, the absolute start positions X and Y of each part are expressed by the following equations.

```
absolute start position X = origin position X × 4 +
                            start position X
absolute start position Y = origin position Y × 4 +
                            start position Y
```

This modification can further reduce the amount of data for a single typeface.

This invention is not limited to the above-described embodiment and modification, but may be modified as follows.

First, although the partial pattern is an element and the basic pattern is a part in the above-described embodiment, the basic pattern may be a stroke. The partial pattern may be a stroke instead. Secondly, the shape data, which is contour data in the above embodiment, may be a dot pattern, a combination of the center line and width, length data, or other types of data. Thirdly, the origin coordinates, which are set in the 256×256 coordinate system in this embodiment, may be set in a 1024×1024 coordinate system and will still reduce the amount of data.

The present examples and embodiment are to be considered as illustrative and not restrictive and the invention is not to be limited to the details given herein, but may be modified in various forms without departing from the spirit of the invention and within the scope of the appended claims.

In short, according to this invention, for each basic pattern, such as a stroke or a part, the origin position of partial pattern like an element or a stroke, is set in the character coordinate system instead of setting the absolute start position in the character coordinate system, and this basic pattern is indicated by the coordinate system of the partial pattern.

Therefore, although the origin position of a partial pattern requires four bytes as it is the absolute position in the character coordinate system, the indication of the start position of a basic pattern simply requires almost two bytes, accomplishing a significant reduction in the amount of data. As many characters and typefaces can be stored within a limited source in an apparatus, the performance of this apparatus can be improved while making the apparatus compact.

What is claimed is:

1. A character generating method for generating character patterns by arranging a plurality of basic patterns constituting each of a plurality of partial patterns which in turn constitute a character pattern, at respective start positions defined from absolute start positions in a character coordinate system, in accordance with a designated character size to form said plurality of partial patterns, and generating said character pattern, said method comprising the steps of:

storing in a memory means origin position data representing origin positions of said partial patterns in a partial-pattern coordinate system set in said character coordinate system, start position data representing start positions of said basic patterns in said partial-pattern coordinate system and shape data representing shapes of said basic patterns;

reading said origin position data of those individual partial patterns constituting a desired character pattern and said start position data of those basic patterns constituting said individual partial patterns from said memory means;

computing, in a computing means, said absolute start positions of said basic patterns from said read origin position data and start position data; and generating said desired character pattern by computing a plurality of coordinates of said basic patterns from respective absolute start positions and said shape data, wherein origin position data of said partial patterns set in a coordinate system whose size is 1/n of said character coordinate system is stored in said memory means in said storing step, n being an integer greater than "1"; and said computing step multiplies, in said computing means, said origin position data by n and adds resultant origin position data to said start position data of said basic patterns to obtain said absolute start positions.

2. The character generating method according to claim 1, wherein said partial patterns are elements of a continuous shape in said character pattern, and said basic patterns are strokes defined by parts of said elements.

3. The character generating method according to claim 2, wherein said character-pattern generating step obtains a pattern outline from each of said absolute start positions according to contour data representing contours of said basic patterns and corresponding to said shape data of an associated one of said basic patterns to form said associated basic pattern.

4. The character generating method according to claim 1, wherein said character-pattern generating step obtains a pattern outline from each of said absolute start positions according to contour data representing contours of said basic patterns and corresponding to said shape data of an associated one of said basic patterns to form said associated basic pattern.

5. A character generating method for generating character patterns by arranging a plurality of basic patterns constituting each of a plurality of partial patterns which in turn constitute a character pattern, at respective start positions defined from absolute start positions in a character coordinate system to form said plurality of partial patterns, thereby generating said character pattern, said method comprising the steps of:

storing, in a memory means, origin position data representing origin positions of said partial patterns in a partial-pattern coordinate system set in said character coordinate system, start position data representing start positions of skeleton patterns of said partial patterns in said partial-pattern coordinate system, offset data representing offset of each of said basic patterns from start points of said skeleton patterns, and shape data representing shapes of said basic patterns; wherein said start position data of said skeleton patterns stored is set common to each font representing the same character;

reading from said memory means said origin position data of those individual partial patterns constituting a desired character pattern, said start position data of those skeleton patterns constituting said individual partial patterns and said offset data of said basic patterns;

computing, in a computing means, said absolute start positions of said basic patterns from said read origin position data, start position data and offset data; and generating said desired character pattern by computing a plurality of coordinates of said basic patterns from said respective absolute start positions and said shape data, wherein origin position data of said partial patterns set in a coordinate system whose size is 1/n of said character coordinate system is stored in said memory means in said storing step, n being an integer greater than "1"; and said computing step adds in said computing means said origin position data multiplied by n, said start position data of said frame patterns and said offset data together to compute said absolute start positions.

6. The character generating method according to claim 5, wherein said partial patterns are elements of a continuous shape in said character pattern, and said basic patterns are strokes defined by parts of said elements.

7. The character generating method according to claim 5, wherein said character-pattern generating step obtains a pattern outline from each of said absolute start positions according to contour data representing contours of said basic patterns and corresponding to said shape data of an associated one of said basic patterns to form said associated basic pattern.

8. A character generating method for generating character patterns by arranging a plurality of basic patterns constituting each of a plurality of partial patterns which in turn constitute a character pattern, at respective start positions defined from absolute start positions in a character coordinate system to form said plurality of partial patterns, thereby generating said character pattern, said method comprising the steps of:

storing in a memory means, origin position data representing origin positions of said partial patterns in a partial-pattern coordinate system set in said character coordinate system, start position data representing start positions of skeleton patterns of said partial-pattern coordinate system, offset data representing offset of each of said basic patterns from start points of said skeleton patterns, and shape data representing shapes of said basic patterns; wherein said start position data of said skeleton patterns stored is set common to each font representing the same character;

reading from said memory means said origin position data of those individual partial patterns constituting a desired character pattern, said start position data of those skeleton patterns constituting said individual partial patterns from said offset data of said basic patterns;

computing, in a computing means, said absolute start positions of said basic patterns from said read origin position data, start position data and offset data; and generating said desired character pattern by computing a plurality of coordinates of said basic patterns from said respective absolute start positions and said shape data, wherein origin position data of said partial patterns set in a coordinate system and start position data of said skeleton patterns set in said coordinate system whose size is 1/n of said character coordinate system are stored in said memory means in said storing step, n being an integer greater than "1"; and said computing step adds in said computing means said origin position data multiplied by n, said start position data of said skeleton patterns multiplied by n, and said offset data together to compute said absolute start positions.

9. The character generating method according to claim 8, wherein said partial patterns are elements of a continuous shape in said character pattern, and said basic patterns are strokes defined by parts of said elements.

10. The character generating method according to claim 8, wherein said character-pattern generating step obtains a pattern outline from each of said absolute start positions according to contour data representing contours of said basic patterns corresponding to said shape data of an associated one of said basic patterns to form said associated basic pattern.

11. A character generating apparatus for generating character patterns by arranging a plurality of basic patterns constituting each of a plurality of partial patterns which in turn constitute a character pattern, at respective start positions defined by absolute start positions in a character coordinate system, in accordance with a designated character size to form said plurality of partial patterns, and generating said character pattern, said apparatus comprising:

a common file for storing origin position data representing origin positions of said partial patterns in a partial-pattern coordinate system set in said character coordinate system, and start position data representing start positions of said basic patterns in said partial-pattern coordinate system;

an individual file for storing shape data representing shapes of said basic patterns; and a character generating circuit for computing said absolute start positions of said basic patterns from said origin position data of a desired character and the associated start position data in said common file, and generating said desired character pattern by computing a plurality of coordinates of said basic patterns from said respective absolute start positions and said shape data in said individual file, wherein said common file stores origin position data of said partial patterns set in a coordinate system whose size is 1/n of said character coordinate system, n being an integer greater than "1"; and said character generating circuit multiplies said origin position data by n and adds resultant origin position data to said start position data of said basic patterns to compute said absolute start positions.

12. The character generating apparatus according to claim 11, wherein said common file stores elements of a continuous shape in said character pattern as said partial patterns, and stores strokes defined by parts of said partial patterns as said basic patterns.

13. The character generating apparatus according to claim 12, wherein said shape data in said individual file is contour data representing contours of said basic patterns in coordinate values; and said character generating circuit obtains a pattern outline from each of said absolute start positions according to contour data that is said shape data of an associated one of said basic patterns to form said associated basic pattern.

14. The character generating apparatus according to claim 11, wherein said shape data in said individual file is contour data representing contours of said basic patterns in coordinate values; and said character generating circuit obtains a pattern outline from each of said absolute start positions according to contour data that is said shape data of an associated one of said basic patterns to form said associated basic pattern.

15. A character generating apparatus for generating character patterns by arranging a plurality of basic patterns constituting each of a plurality of plurality of partial patterns which in turn constitute a character pattern at respective start positions defined from absolute start positions in a character coordinate system, in accordance with a designated character size to form said plurality of partial patterns, and generating said character pattern, said apparatus comprising:

a common file for storing origin position data representing origin positions of said partial patterns in a partial-pattern coordinate system set in said character coordinate system, and start position data representing start positions of skeleton patterns of said partial patterns in said partial-pattern coordinate system; wherein said start position data of said skeleton patterns stored is set common to each font representing the same character;

an individual file for storing offset data representing offset of each of said skeleton patterns from start points of said skeleton patterns, and shape data representing shapes of-said basic patterns; and a character generating circuit for computing said absolute start positions of said basic patterns from said origin position data of those individual partial patterns constituting a deposition data of pattern, said start position data of those skeleton patterns constituting said partial patterns and said offset data of said basic patterns, and generating said desired character pattern by computing a plurality of coordinates of said basic patterns from said respective absolute start positions and said shape data in said individual file, wherein said common file stores origin position data of said partial patterns set in a coordinate system whose size is 1/n of said character coordinate system n being an integer greater than "1"; and said character generating circuit adds said origin position data multiplied by n, said start position data of said frame patterns and said offset data together to compute said absolute start positions.

16. The character generating apparatus according to claim 15, wherein said common file stores elements of a continuous shape in said character pattern as said partial patterns, and stores strokes defined by parts of said partial patterns as said basic patterns.

17. The character generating apparatus according to claim 15, wherein said shape data in said individual file is contour data representing contours of said basic patterns in coordinate values; and said character generating circuit obtains a pattern outline from each of said absolute start positions according to contour data that is said shape data of an associated one of said basic patterns to form said associated basic pattern.

18. A character generating apparatus for generating character patterns by arranging a plurality of basic patterns constituting each of a plurality of partial patterns which in turn constitute a character pattern at respective start positions defined from absolute start positions in a character coordinate system, in accordance with a designated character size to form said plurality of partial patterns, and generating said character pattern, said apparatus comprising:

a common file for storing origin position data representing origin positions of said partial patterns in a partial-pattern coordinate system set in said character coordinate system, and start position data representing start positions of skeleton patterns of said partial patterns in said partial-pattern coordinate system; wherein said start position data of said skeleton patterns stored is set common to each font representing the same character;

an individual file for storing offset data representing offset of each of said skeleton patterns from start points of said skeleton patterns, and shape data representing shapes of said basic patterns; and a character generating circuit for computing said absolute start positions of said basic patterns from said origin position data of those individual partial patterns constituting a desired character pattern, said start position data of those skeleton patterns constituting said partial patterns and said offset data of said basic patterns, and generating said desired character pattern by computing a plurality of coordinates of said basic patterns from said respective absolute start positions and said shape data in said individual file, wherein said common file stores origin position data of said partial patterns set in a coordinate system whose size is 1/n of said character coordinate system and start position data of said skeleton patterns set in said coordinate system whose size is 1/n of said character coordinate system, n being an integer greater than "1"; and said character generating circuit adds said origin position data multiplied by n, said start position data of said skeleton patterns multiplied by n, and said offset data together to compute said absolute start positions.

19. The character generating apparatus according to claim 18, wherein said common file stores elements of a continuous shape in said character pattern as said partial patterns, and stores strokes defined by parts of said partial patterns as said basic patterns.

20. The character generating apparatus according to claim 18, wherein said shape data in said individual file is contour data representing contours of said basic patterns in coordinate values; and said character generating circuit obtains a pattern outline from each of said absolute start positions according to contour data that is said shape data of an associated one of said basic patterns to form said associated basic pattern.

\* \* \* \* \*